June 15, 1965 W. T. MILLER 3,189,912
ADJUSTABLE TEMPLE MEMBERS FOR SPECTACLES AND
METHOD OF ASSEMBLY
Filed March 10, 1961
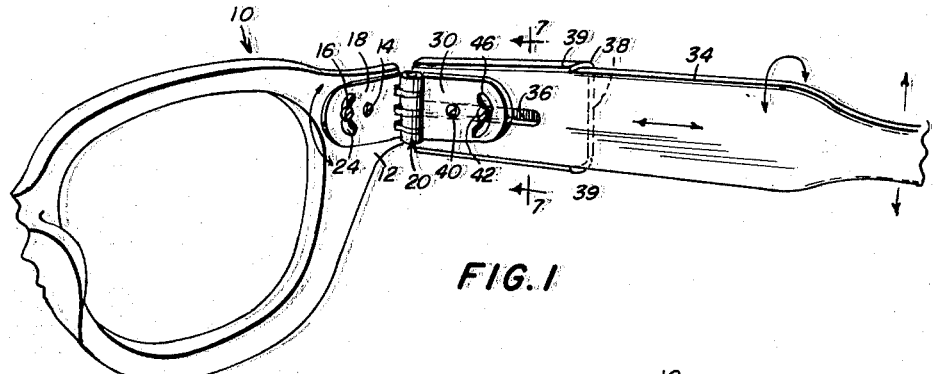
FIG. 1
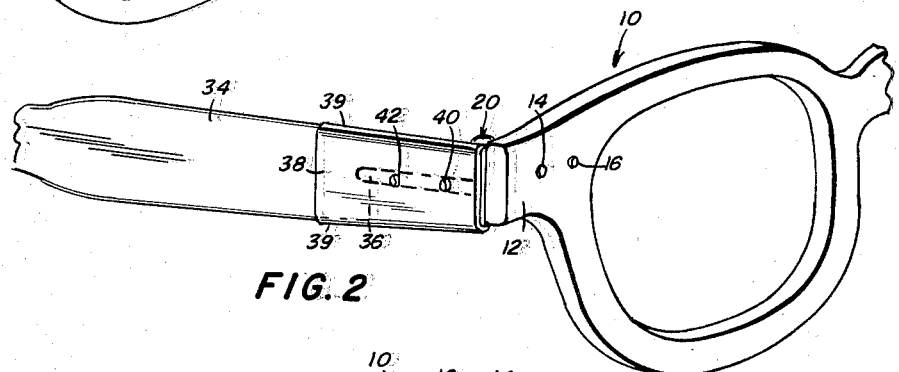
FIG. 2
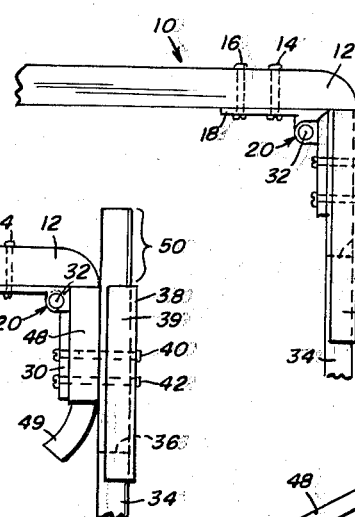
FIG. 3
FIG. 4
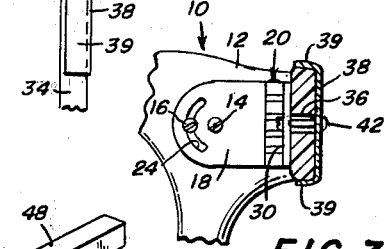
FIG. 7
FIG. 8
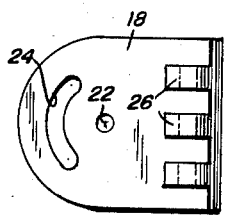
FIG. 5
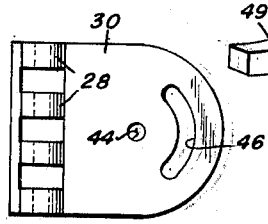
FIG. 6
INVENTOR
WILLARD T. MILLER
BY Fisher, Christen & Goodson
ATTORNEYS

United States Patent Office 3,189,912
Patented June 15, 1965

3,189,912
ADJUSTABLE TEMPLE MEMBERS FOR SPECTA-
CLES AND METHOD OF ASSEMBLY
Willard T. Miller, Silver Spring, Md., assignor of one-
half to Crawford Maddox, Washington, D.C.
Filed Mar. 10, 1961, Ser. No. 94,852
3 Claims. (Cl. 351—118)

This invention relates to spectacles in general, but the disclosure hereinafter set forth is not specifically limited thereto, the disclosure having application to other ophthalmic aids such as goggles, sun glasses and the like.

More specifically, the invention proposes a lens-supporting frame, and a means for attaching the temple to the frame whereby the temple can be rapidly and accurately fitted to the wearer's head with relative ease.

The prior art shows spectacles and the like having temples which are adjustable along or about one or two axes at the most. The limited movement of the temple thus attained requires further adjustment by way of manually bending or twisting the temple to accommodate the measurements and contours of the wearer's head.

It is therefore, an object of this invention to provide an ophthalmic aid which can be rapidly and accurately fitted to the wearer. More specifically, this invention provides for a three-way adjustment of the temple, first, about a horizontal fore and aft axis, second, about a horizontal transverse axis and third, a fore and aft adjustment of the length of the temple.

It is another object of this invention to provide an ophthalmic aid which can be rapidly and accurately fitted to the wearer's head without need for subsequent adjustment and fitting.

These and other objects and advantages of the invention will materialize upon examination of the following drawings and description. It will become apparent that re-arrangement of parts or changes of design or construction will not depart from the spirit and scope of this invention as expressed in the following claims. The means and methods shown and described, thus, are limited only to the extend that they are preferred forms, and have been shown and expressed only by way of illustration.

With reference, now, to the drawings:

FIG. 1 is a perspective view showing the right-hand portion of a lens-bearing frame, the front portion of the right-hand temple and a bi-axially articulated hinge interconnecting the lens-bearing frame and the temple.

FIG. 2 is an obverse view of FIG. 1.

FIG. 3 is an enlarged top plan view of part of FIG. 1, showing the use of a shim in positioning the parts in a preliminary assembling position.

FIG. 4 is a view similar to FIG. 3, showing the parts in final assembled position, with the shim removed.

FIG. 5 is an enlarged view of the front hinge plate.

FIG. 6 is an enlarged view of the side hinge plate.

FIG. 7 is a section of line 7—7 of FIG. 1.

FIG. 8 is an enlarged perspective view of the shim of FIG. 3.

Referring to FIG. 1, 10 indicates in general the right-hand portion of a lens-bearing frame having an extension 12. The extension 12 is apertured to receive screws or small bolts 14 and 16 which serve as pivot and lock-screws respectively for front plate 18 of a hinge generally indicated at 20. Side-plate 18 of hinge 20 is apertured as at 22, FIG. 5, to receive pivot screw 14, and arcuately slotted as at 24 to co-operate with lock screw 16. A plurality of vertically separated, co-axially apertured barrels 26 integral with side-plate 18 co-operate with a plurality of barrels 28 integral with a side-plate 30 of hinge 20 (see FIG. 6). Side plate 30 is generally identical in configuration to side-plate 18 with the exception of the number of barrels involved.

Side plates 18 and 30 of hinge 20 are enmeshed and pivoted together by a pin or screw 32 (see FIG. 4) extending through barrels 26 and 28 of the two hinge plates.

A bifurcated temple 34 having an open slot 36 in the forward portion is partially enclosed at the forward portion of temple 34 by a substantially U-shaped clamp plate 38 slidably engaging temple 34.

An important feature of the clamp plate 38, FIG. 7, is that its outer edges are curved as at 39 to grip the temple on opposite sides to prevent any spreading of the end of the temple due to slot 36; plate 38 also conceals the slot 36. Plate 38 can be suitably ornamental, as desired.

The clamp plate 38 is apertured to receive screws 40 and 42 which extend through slot 36 in the bifurcated temple 34 and also extend through side-plate 30 of hinge 20. The screw 40 extends through the aperture 44 and serves as a pivot for the temple and the screw 42 extends through arcuate slot 46 in side plate 30 to provide a second adjustment, namely about a horizontal transverse axis represented by pivot 40.

For the purpose of fitting the spectacles to the wearer's head, a shim 48, FIGS. 3 and 8 is temporarily inserted between the temple 34 and side plate 30 of hinge 20 to permit longitudinal movement of temple 34 as required, either in a forward or rearward direction, beyond the extension 12, as in FIG. 3.

Shim 48, as in FIG. 3, is thick enough to cause temple 34 to project beyond extension 12 of the glass frame, so that any excess length 50 can be cut off. Shim 48 may be provided with a manipulating handle portion 49.

In the adjustment procedure, screws 14 and 16 of the lens-bearing frame and screws 40 and 42 of the temple with shim 48 in place are relieved to the extent that side plates 18 and 30 of hinge 20 are lightly frictionally biased to the lens-bearing frame 10 and temple 34 respectively. The spectacles are then placed on the wearer's head and the temple 34 is moved backward or forward along the longitudinal axis thereof via slot 36 to secure proper length of the temple. The temple is then rotated about its transverse axis, pivot screw 40, and arcuate slot 46 in slide plate 30, the latter moving relative to the screw 42 to obtain the proper angle of inclination with respect to the lens-bearing frame and the wearer's eyes. At this time, the screws 40 and 42 are securely tightened and cemented if desired. The spectacles are then removed from the wearer's head and the temple 34 with shim 48 and hinge 20 in place is removed from the lens-bearing frame 10. The excess portion of the temple 50 is then cut off flush with the shim 48. The shim is then removed and the temple is again frictionally secured to the lens-bearing frame 10 via hinge 20. The temple is readjusted in such a manner that the forward end thereof abuts the lens-bearing frame 10, and screws 40 and 42 are once again tightened. The temple 34 is then rotated about its longitudinal axis via the pivot screw 14, and arcuate slot 24 of side-plate 18 in any direction necessary to secure a comfortable fit with respect to the ear-hook (not shown) and the mastoidal area. Screws 14 and 16 are then tightened and cemented if desired, and this step completes the fitting and adjustment procedures.

Three way adjustment.

To summarize the three adjustments achieved by this invention:

(1) Adjustment of the temple about a transverse horizontal axis to fit the wearer is achieved by moving the temple up and down, about pivot 40 in hinge plate 30 as an axis; hinge plate 30 locked permanently in place by lock screw 42. An appropriate cement may be used if necessary or desired to lock screw 42.

(2) Adustment of the temple about a horizontal fore and aft axis to fit the wearer, is made about pivot pin 14 as an axis. The hinge plate 18 then is locked permanently in place by lock screw 16 in the appropriate position in slot 24 of plate 18. An appropriate cement may be used on the threads if desired or necessary to lock the screw 16.

(3) The length of the temple to fit the wearer is determined by positioning shim as in FIG. 3, the excess portion 50 being then cut off.

These three adjustments are made by the dispenser to fit the wearer and avoid the several bending operations usually necessary, so that a much smaller stock of temple sizes need to be kept on hand, and yet a satisfactory fit by the three described adjustments, readily achieved for persons having widely different facial and cranial characteristics.

I claim as my invention:

1. In a spectacle frame mounting including a hinge having front and side plates and an extra long temple having an open ended slot in its forward end, the method of determining the proper length for the temple comprising positioning a spacer shim between said side plate and the slotted end of the temple so that the slotted end of the temple projects beyond the frame, and is movable back and forth, fitting said temple to determine the proper length of the temple for the prospective use, cutting off the excess length of said slotted end, removing the shim, and securing the temple in place on the side plate.

2. A spectacle mounting comprising a frame and a temple, a hinge including side and front plates for the temple and frame, respectively, each of said plates having an aperture near the hinge axis and having an arcuate slot further away from the hinge axis, a pivot in each of said apertures, passing into engagement with the adjacent temple and frame, respectively, a locking member passing through each arcuate slot into engagement with the adjacent temple and frame, respectively, whereby the temple may be variably positioned with respect to said side plate about the pivot therein, about a horizontal transverse axis, and whereby the frame may be variably positioned with respect to said front plate about the pivot therein, about a horizontal fore and aft axis; the forward end of said temple being slotted at its forward end for longitudinal adjustment, and wherein said pivot and said locking member for the side plate pass through the slot in the end of the temple.

3. A spectacle mounting comprising a frame and a temple, a hinge including side and front plates for the temple and frame, respectively, each of said plates having an aperture near the hinge axis and having an arcuate slot further away from the hinge axis, a pivot in each of said apertures, passing into engagement with the adjacent temple and frame, respectively, a locking member passing through each arcuate slot into engagement with the adjacent temple and frame, respectively, whereby the temple may be variably positioned with respect to said side plate about the pivot therein, about a horizontal transverse axis, and whereby the frame may be variably positioned wtih respect to said front plate about the pivot therein, about a horizontal fore and aft axis; and wherein the forward end of the temple is slotted at its forward end for longitudinal adjustment of the temple length and further including a clamping plate on the outside of the temple, adjacent the slot therein, said clamping plate being engaged over the top and bottom edges of the temple and being held in place by the pivot and locking member passing through said side plate.

References Cited by the Examiner
UNITED STATES PATENTS

| 1,243,466 | 10/17 | Weigel | 88—20 |
| 1,984,136 | 12/34 | Kapernick | 88—53 |
| 2,080,503 | 5/37 | Petersen | 88—53 |
| 2,688,274 | 9/54 | Belgard | 88—53 |

FOREIGN PATENTS

| 907,403 | 6/45 | France. |
| 16,671 | 3/82 | Germany. |

References Cited by the Applicant
UNITED STATES PATENTS 3,060,804　10/62　Rogers.

JEWELL H. PEDERSEN, *Primary Examiner.*
WILLIAM MISIEK, *Examiner.*